United States Patent
Guney et al.

(10) Patent No.: US 10,649,812 B1
(45) Date of Patent: May 12, 2020

(54) COMPUTATION USING TENANT AND COMMINGLING PROCESSORS

(71) Applicant: Workday, Inc., Pleasanton, CA (US)

(72) Inventors: Erol Guney, San Ramon, CA (US); Eric James Ranstrom, San Francisco, CA (US); Kayla Marie Kimura, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 74 days.

(21) Appl. No.: 15/693,933

(22) Filed: Sep. 1, 2017

(51) Int. Cl.
*G06F 9/50* (2006.01)
*G06F 16/182* (2019.01)
*H04L 29/08* (2006.01)

(52) U.S. Cl.
CPC .......... *G06F 9/5033* (2013.01); *G06F 9/5072* (2013.01); *G06F 16/182* (2019.01); *H04L 67/10* (2013.01)

(58) Field of Classification Search
CPC ..... G06F 9/5033; G06F 16/182; G06F 9/5072
USPC ........................................................ 718/104
See application file for complete search history.

(56) References Cited

U.S. PATENT DOCUMENTS

| | | | | |
|---|---|---|---|---|
| 5,999,351 A * | 12/1999 | Albrecht | ............... | G11B 21/083 360/48 |
| 6,157,934 A | 12/2000 | Khan | | |
| 10,021,185 B1 * | 7/2018 | Kleinschnitz, Jr. | ....... | G06F 9/50 |
| 2008/0306382 A1 * | 12/2008 | Guracar | .............. | G01S 15/8995 600/437 |
| 2011/0138027 A1 * | 6/2011 | Friedmann | .............. | H04L 67/10 709/223 |
| 2012/0066682 A1 | 3/2012 | Al-Aziz | | |
| 2012/0096521 A1 * | 4/2012 | Peddada | ............... | G06F 21/629 726/4 |
| 2012/0324419 A1 * | 12/2012 | Roberts | ................ | G06Q 10/101 717/102 |
| 2014/0032525 A1 | 1/2014 | Merriman | | |
| 2014/0179297 A1 | 6/2014 | Sahoo | | |
| 2014/0282367 A1 | 9/2014 | Harrill | | |
| 2014/0282907 A1 * | 9/2014 | Ignatchenko | ......... | H04L 9/3234 726/4 |
| 2015/0032742 A1 * | 1/2015 | Nakamura | .............. | G06F 16/95 707/736 |
| 2015/0205974 A1 * | 7/2015 | Talley | ................. | G06F 11/2094 707/781 |
| 2015/0278066 A1 | 10/2015 | France | | |
| 2016/0334998 A1 * | 11/2016 | George | ................. | G06F 3/0608 |
| 2017/0277727 A1 * | 9/2017 | Chen | ....................... | G06F 21/56 |
| 2018/0330288 A1 | 11/2018 | Harding, Jr. | | |

* cited by examiner

*Primary Examiner* — Emerson C Puente
*Assistant Examiner* — Sen Thong Chen
(74) *Attorney, Agent, or Firm* — Van Pelt, Yi & James LLP

(57) ABSTRACT

A system for performing a computation includes a tenant associated processor; a commingling associated processor; an interface; and a processor. The interface is configured to receive an indication of a computation. The processor is configured to determine a set of computational steps for performing the computation; determine a preprocessing subset, wherein the preprocessing subset comprises a subset of the set of computational steps for execution by the tenant associated processor; and determine a main processing subset, wherein the main processing subset comprises the set of computational steps for execution by the commingling associated processor.

19 Claims, 13 Drawing Sheets

US 10,649,812 B1

COMPUTATION USING TENANT AND COMMINGLING PROCESSORS

BACKGROUND OF THE INVENTION

A system for a multitenanted database stores data for a plurality of tenants (e.g., organizations utilizing database services). Each tenant comprises a plurality of users (e.g., company employees). The multitenanted database stores user data for each user of each tenant (e.g., name, identification number, title, salary, etc.). Tenant data is stored on a set of data partitions securely separated by tenant (e.g., on different computers, on different hard drives, on different virtual machines, etc.) in order to prevent users from accessing data belonging to other tenants. The system for a multitenanted database, comprising the large set of tenant data, has the capability to produce data analyses that would be valuable to each tenant (e.g., typical group size within organizations of different sizes, average salaries for different employee roles, etc.). Performing these data analyses requires commingling of tenant data (e.g., bringing data of different tenants together in order to analyze it as a single data set). Commingled data is transferred from the tenant data storage to a commingling storage unit and analyzed on the commingling storage unit. The data analyses can be complex operations involving big data and many computational steps, creating a problem where the commingled data server is unable to process the computational load efficiently.

BRIEF DESCRIPTION OF THE DRAWINGS

Various embodiments of the invention are disclosed in the following detailed description and the accompanying drawings.

DETAILED DESCRIPTION

Figure 1:
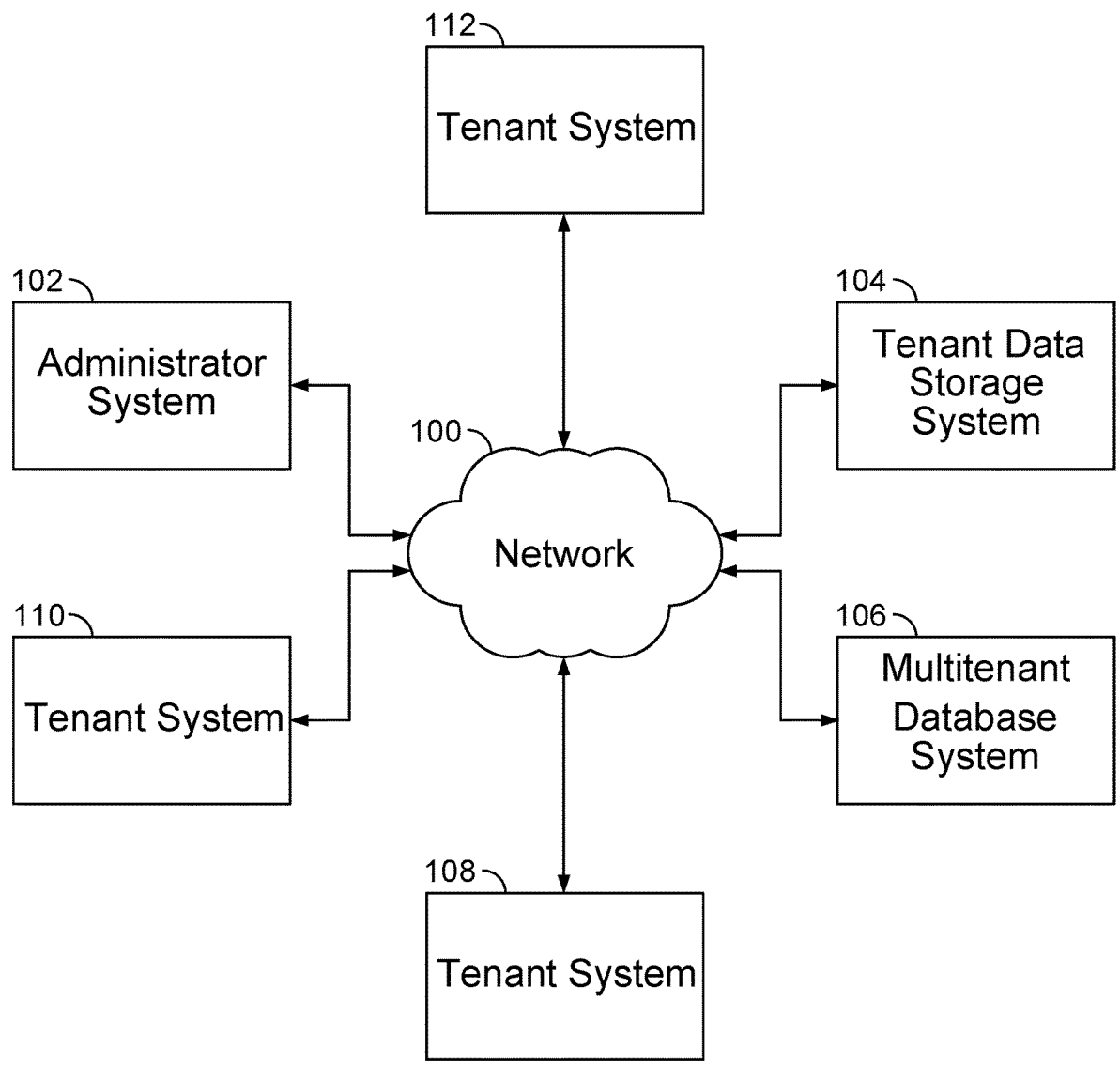
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for performing a computation comprises a tenant associated processor, a commingling associated processor, an interface configured to receive an indication of a computation, and a processor configured to determine a set of computational steps for performing the computation; determine a preprocessing subset, wherein the preprocessing subset comprises a subset of the set of computational steps for execution by the tenant associated processor; and determine a main processing subset, wherein the main processing subset comprises the set of computation steps for execution by the commingling associated processor. In some embodiments, the system additionally comprises a memory coupled to the processor and configured to provide the processor with instructions.

A system for performing a computation is disclosed. The system comprises an interface and a processor. The interface is configured to receive an indication of a computation from a tenant associated user. The processor is configured to determine a set of computational steps for performing the computation, wherein each computation step of the set of computational steps adheres to a pipelining criterion; determine associated processors for subsets of the set of computational steps, wherein the associated processors include a tenant associated processor or a commingling associated processor; and cause execution of the set of computational steps using the associated processors. In some embodiments, the system additionally comprises a memory coupled to the processor and configured to provide the processor with instructions.

A system for performing a computation comprises a system for determining a set of computational steps for performing the computation. The computation involves determining an analysis of commingled data (e.g., a benchmark calculation performed on commingled data sourced from a plurality of tenants) that provides the ability to compare and contrast tenant data with other tenants' data in a secure manner. The computation steps are broken into subsets of steps (e.g., a preprocessing subset, a main processing subset, and a post processing subset) and each subset is associated with a processor (e.g., a tenant associated processor or a commingling associated processor) so that the computation can be performed efficiently or performed securely. The steps can also be broken into subsets associated with a pipeline module of a library of pipeline modules so that the computation can be constructed and performed efficiently using pre-built available modules.

The system comprises a set of isolated tenant data storage units (e.g., a set of data storage servers, a set of computers, a set of hard drives, a set of data partitions, a set of virtual machines, a set of containers, etc.) for storing and/or processing tenant data (e.g., data for a tenant user of the database system) isolated from other tenant data and a commingling storage unit for storing commingled tenant data. The system determines a sequence of computational operations necessary for performing the computation and groups of computational operations into computational steps to form a number of subsets of computational steps (e.g., a preprocessing subset of steps, a main processing subset of steps, and/or a postprocessing subset of steps). The preprocessing subset and postprocessing subset are executed by tenant side systems and the main processing subset is executed by the multitenant database or other commingling related systems. After the computational subsets are determined, they are stored, for example on the tenant storage unit or on a commingling storage unit. A computational subset is provided from the storage location to the execution location when necessary for execution of the computation. An indication is provided to the appropriate execution hardware to execute the preprocessing subset, the main processing subset, and/or the postprocessing subset. Also, the appropriate inputs and outputs to the subsets are transferred appropriately for processing. For example, executing the main processing subset comprises transferring data processed by the preprocessing subset to the system for processing by the main processing subset. And similarly, executing the postprocessing subset comprises transferring output data from the main processing subset processing system to be input to the postprocessing subset processing system.

The preprocessing subset is associated with the tenant data storage unit. When the preprocessing subset is determined, tenant data category preferences are taken into account, removing steps that include tenant data indicated by the tenant not to be commingled. A separate tenant preprocessing subset is determined associated with each tenant and the tenant preprocessing subset is provided to the associated tenant data storage unit. In some cases, the preprocessing is performed and then the preprocessed data is transferred to be stored in a commingling storage (e.g., as pre-cubed data) for one or more calculations.

In some cases, the tenant associated processor preprocesses data before transferring data to be stored in a commingling data storage unit. This can reduce storage requirements and/or data transfer requirements. The data stored in the commingling storage is then already preprocessed for certain analytic calculations.

In some embodiments, the set of computational steps comprises a set of computational steps adhering to pipelining criteria to allow them to be used in a pipelined processing system. A pipelined processing system comprises a plurality of processing units, wherein each processing unit simultaneously performs a different step of a multistep process (e.g., a first processor performs a first processing step on a second set of data while a second processor performs a second processing step on a first set of data; when the first processing step and the second processing step are complete, the first processor performs the first processing step on a third set of data while a second processing processor performs a second processing step on the second set of data, etc.). The pipelining criteria comprise criteria for ensuring that the pipelining process will run successfully and efficiently.

In various embodiments, the tenant associated processor comprises a processor associated with a tenant server, a tenant storage unit, or any other appropriate tenant dedicated processor. In various embodiments, the commingling associated processor comprises a processor associated with a commingling server, a commingling storage unit, a multitenant database, or any other appropriate tenant dedicated processor.

FIG. 1 is a block diagram illustrating an embodiment of a network system. In some embodiments, the network system of FIG. 1 comprises a system for flexible modular pipelined analytics. In the example shown, tenant system 108, tenant system 110, and tenant system 112 store data associated with each of the different systems in separate areas of tenant data storage system 104. This separation ensures that a given tenant's data is secure. However, there are times when it is useful to have access to a pool of many tenants' data in exchange for providing access to the tenant's own data. Data that is part of the multitenant pool of data is stored either in tenant data storage system 104 in a comingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. Administrator system 102 is able to administrate different components of the system including multitenant database system 106.

Tenant data storage system 104 or multitenant database system 106 comprises a system for flexible modular pipelined analytics or a system for computation using tenant and commingling processors. The system receives an indication of a computation (e.g., from a user using administrator system 102 or tenant system 108, etc.). The system determines a set of computational steps for performing the computation. The steps are broken into subsets of steps including a preprocessing subset, a main processing subset, and a postprocessing subset. The preprocessing subset and the postprocessing subset are the parts of the calculation performed by a tenant associated processor. The main processing subset is the part of the calculation performed by a commingling associated processor. In some cases, a preprocessing subset and/or the postprocessing subset are null sets and all the processing is performed as part of a main processing subset by a commingling associated processor. In addition, in some cases the subsets of steps are implemented by modules of calculation that can be pipelined together that are available in a library of modules. These modules are automatically determined and used by the system or are selected by a user determining the analytical calculation desired to be performed.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer employee, organization, financial data, etc.). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a comingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Figure 3:
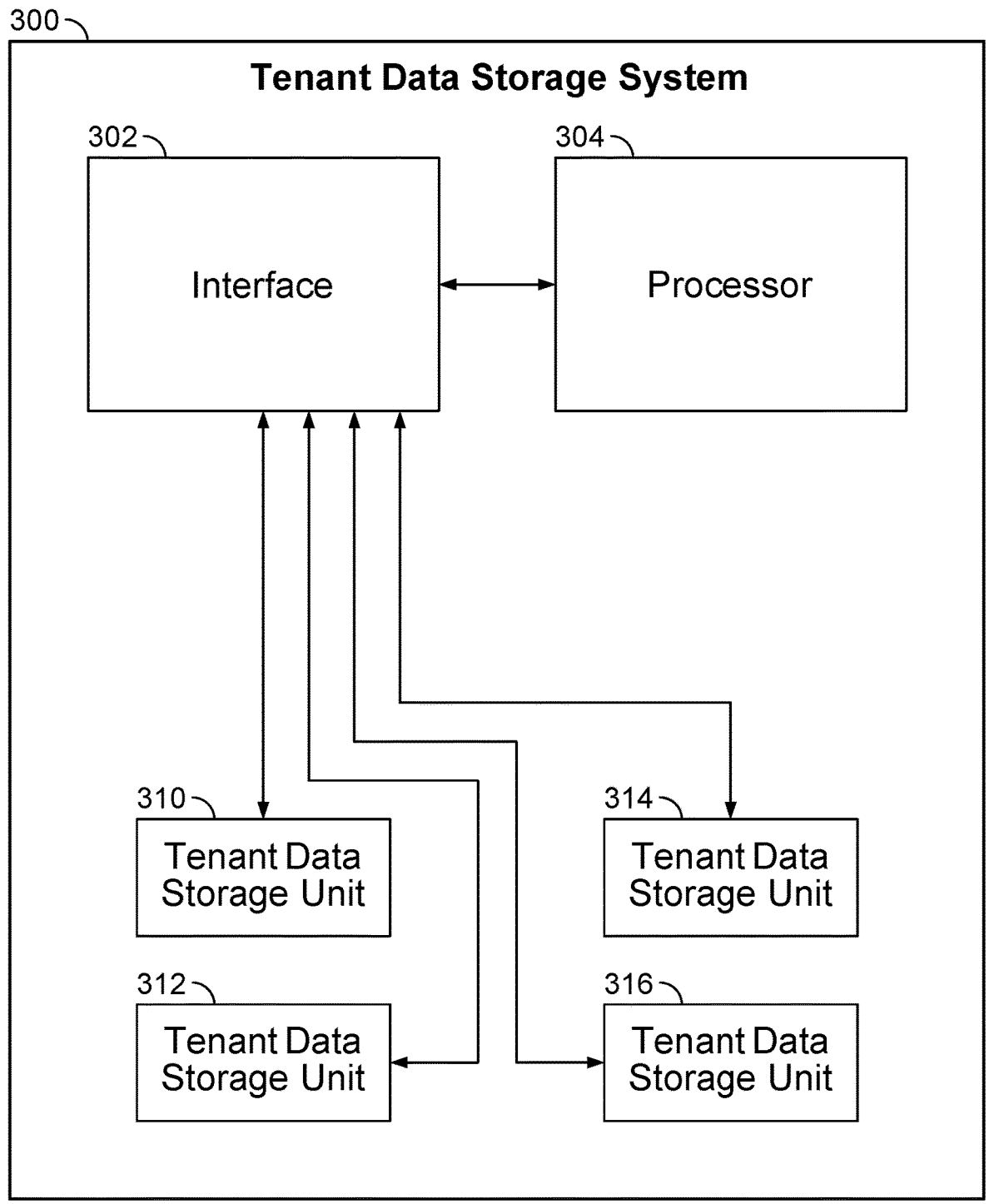
FIG. 3 is a block diagram illustrating an embodiment of a tenant data storage system.
Figure 4:
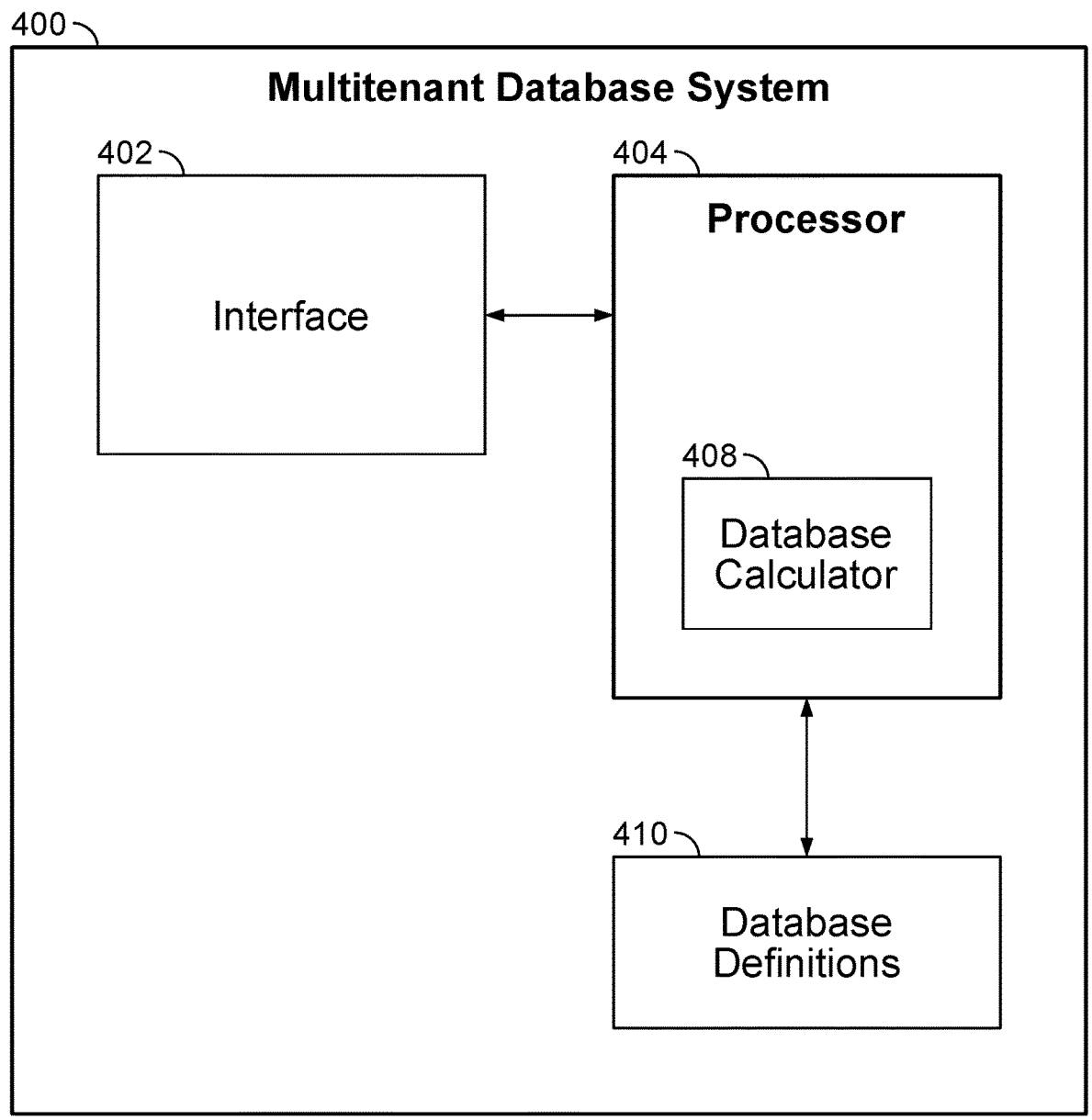
FIG. 4 is a block diagram illustrating an embodiment of a multitenant database system.
Figure 5:
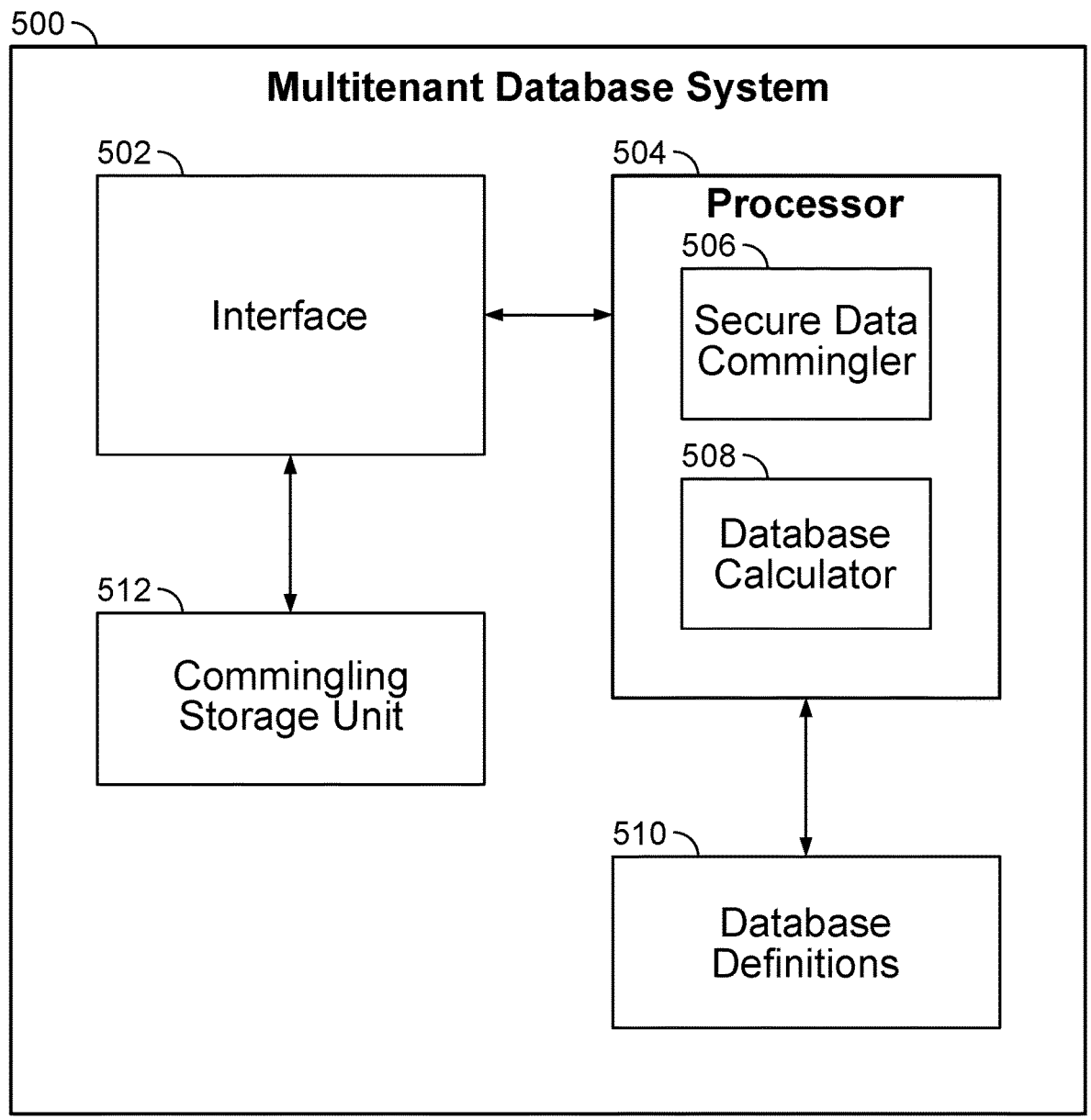
FIG. 5 is a block diagram illustrating an embodiment of a multitenant database system.

In the following FIGS. 2, 3, 4, and 5, variations of the location of the subsystems of the secure data commingler and the commingling storage unit are shown. Specifically, the location of the secure data commingler and the commingling storage unit is either in the tenant data storage unit (a combination of FIG. 2 and FIG. 5 are used as the implementations for the corresponding units in FIG. 1), the multitenant database system (a combination of FIG. 3 and FIG. 4 are used as the implementations for the corresponding units in FIG. 1), or both the tenant data storage unit and the multitenant database system (a combination of FIG. 2 and FIG. 4 are used as the implementations for the corresponding units in FIG. 1).

Figure 2:
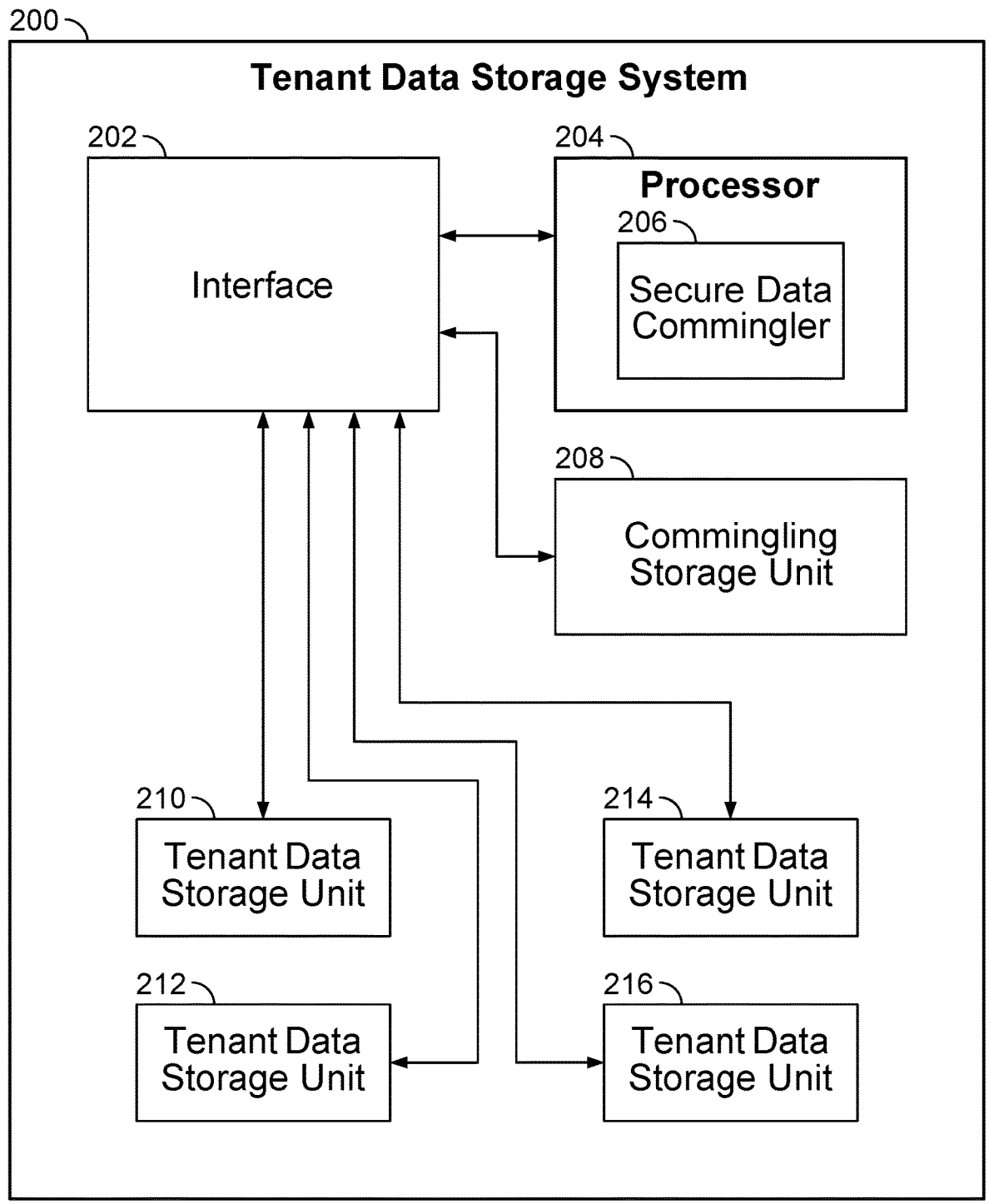
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area—for example, each tenant data storage unit could be entirely associated with a different single tenant. The plurality of tenant data storage units serves to store data associated with different tenants. Tenant data storage system 200 comprises any appropriate number of tenant data storage units. Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208.

Secure data commingler 206 of processor 204 is configured to build an analytic database stored in commingling storage unit 208 using commingled data stored on commingling storage unit 208. Processor 204 is also able to perform a computation on data stored in commingling storage unit 208. A request to perform a computation is received via interface 202 by processor 204 and a set of computational steps for performing the computation is determined. Processor 204 then determines, if appropriate, a preprocessing subset of the set of computational steps, comprising a subset of the set of computational steps that can be executed using a tenant associated processor (e.g., a processor that is processing computational steps that require only data from one tenant data storage unit at a time). Processor 204 also determines a main processing subset of the set of computational steps, comprising a subset of the set of computational steps to be executed on a commingling associated processor (e.g., a processor that is processing computational steps utilizing commingled data). Processor 204 provides the preprocessing subset and the main processing subset for storage (e.g., on a tenant data storage unit, on commingling storage unit 208, etc.) and for execution. Processor 204 also provides an indication to execute the preprocessing subset and an indication to execute the main processing subset. In various embodiments, the tenant associated processor comprises processor 204, a processor associated with a tenant server system, a processor associated with a tenant data storage unit (e.g., tenant data storage unit 210, tenant data storage unit 212, tenant data storage unit 214, tenant data storage unit 216, etc.), or any other processor able to process tenant associated data. In various embodiments, the commingling associated processor comprises processor 204, a processor associated with a commingling system, a multitenant database system, a processor associated with a commingling storage unit (e.g., commingling storage unit 208, storage on a multitenant database system, etc.), or any other processor able to process commingled data.

In some embodiments, secure data commingler 206 additionally determines a postprocessing subset of the set of computational steps, comprising a subset of the set of computational steps to be executed on a tenant data storage unit after the main processing subset.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way. In various embodiments, tenant data storage system 200 comprises 1, 2, 5, 22, 89, or any other appropriate number of tenant data storage units.

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. Each tenant has associated with it a separate storage area—for example, each tenant data storage unit could be entirely associated with a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data. Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316) and for providing and receiving tenant data to be commingled in a commingling storage unit.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a comingling storage unit and provides the report to the user. The data in comingling storage unit is acquired using a secure data comingler from a number of tenant data storage units. A tenant can opt into sharing data for use by a service (e.g., a benchmarking service) and the data is transferred to a comingling storage unit.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a comingling storage unit (e.g., comingling storage unit 512) and provides the report to the user. The data in comingling storage unit 512 is acquired using secure data comingler 506 from a number of tenant data storage units. A tenant can opt into sharing data for use by a service (e.g., a benchmarking service) and the data is transferred to a comingling storage unit (e.g., comingling storage unit 512).

Secure data commingler 506 of processor 504 is configured to build an analytic database stored in commingling storage unit 512 using commingled data stored on commingling storage unit 512. Processor 504 additionally comprises a system for performing a computation. A request to perform a computation is received by processor 504 and a set of computational steps for performing the computation is determined. Processor 504 then determines a preprocessing subset of the set of computational steps, comprising a subset of the set of computational steps that can be executed using a tenant associated processor (e.g., a processor for executing computational steps that require only data from one tenant data storage unit at a time) and a main processing subset of the set of computational steps, comprising a subset of the set of computational steps to be executed on a commingling associated processor (e.g., a processor for executing computational steps utilizing commingled data). Processor 504 then provides the preprocessing subset and the main processing subset for storage (e.g., on a tenant data storage unit, on commingling storage unit 512, etc.) and for execution. Processor 504 then provides an indication (e.g., to a tenant data storage unit, to a plurality of tenant data storage units) to execute the preprocessing subset and an indication (e.g., to commingling storage unit 512) to execute the main processing subset.

In some embodiments, processor 504 additionally determines a postprocessing subset of the set of computational steps, comprising a subset of the set of computational steps to be executed on a tenant data storage unit after the main processing subset.

In some embodiments, the commingling storage unit and the secure data commingler is split between two systems and in that case multitenant database system 500 of FIG. 5 can be used in conjunction with tenant data storage system of FIG. 2. In some cases, each of the two comingling storage units are operated by the associated collocated secure data commingler. Data for a report is separately retrieved from each comingling storage unit.

Figure 6A:
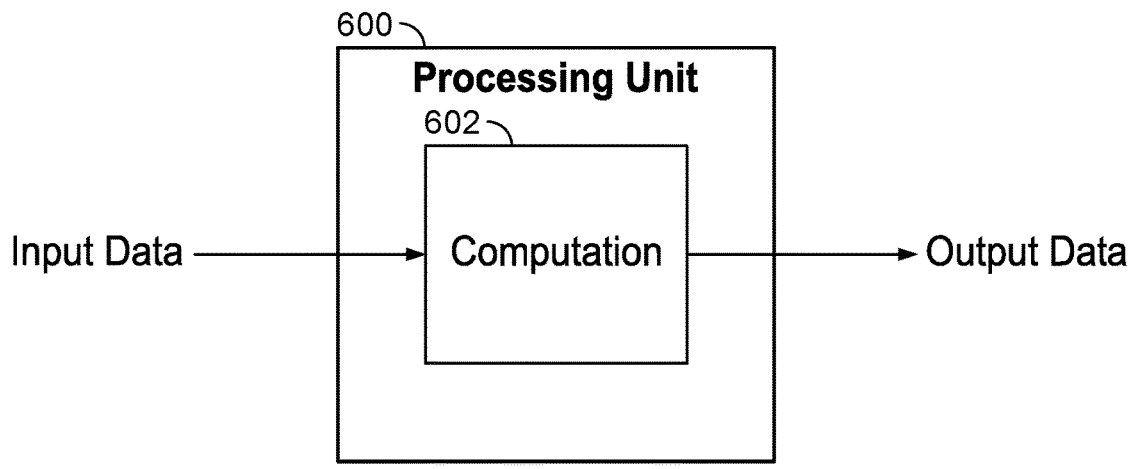
FIG. 6A is a block diagram illustrating an embodiment of a computation

FIG. 6A is a block diagram illustrating an embodiment of a computation. In some embodiments, the computation of FIG. 6A comprises a computation received by tenant data storage system 200 for execution. In the example shown, computation 602 is executed by processing unit 600 (e.g., a processing unit of a tenant data storage system, of a commingling storage unit, of a tenant data storage unit, etc.). Computation 602 receives input data and produces output data.

Figure 6B:
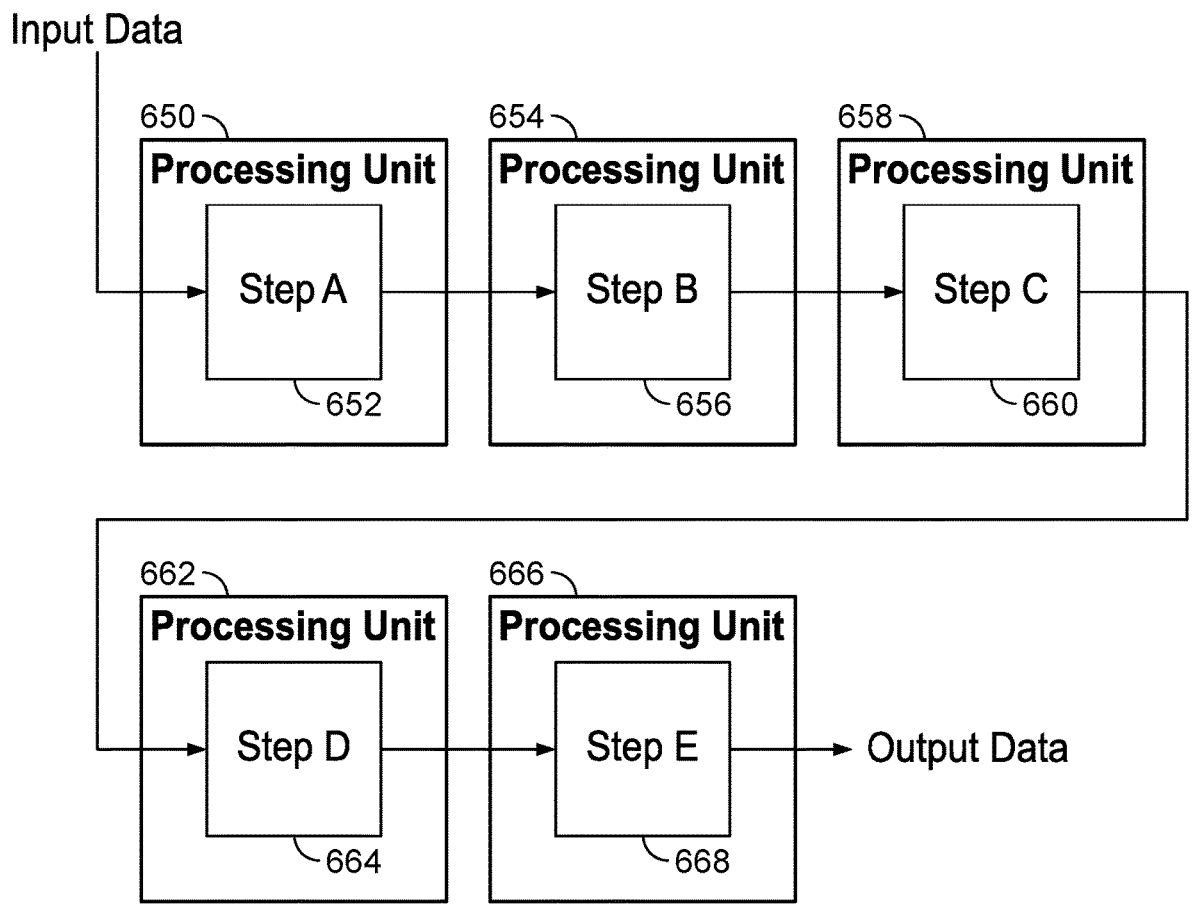
FIG. 6B is a block diagram illustrating an embodiment of a computation.

FIG. 6B is a block diagram illustrating an embodiment of a computation. In some embodiments, the computation of FIG. 6B comprises the computation of FIG. 6A. In the example shown, the computation of FIG. 6B is executed by executing Step A 652, followed by Step B 656, followed by Step C 660, followed by Step D 664, followed by Step E 668. Step A 652 receives input data and Step E 668 produces output data. Step A 652, Step B 656, Step C 660, Step D 664, and Step E 668 together comprise a set of computational steps for executing the computation. Step A 652 is executed by processing unit 650; Step B 656 is executed by processing unit 654; Step C 660 is executed by processing unit 658; Step D 664 is executed by processing unit 662; and Step E 668 is executed by processing unit 666.

In various embodiments, processing unit 650, processing unit 654, processing unit 658, processing unit 662, and processing unit 666 comprise processing units of a single processor, individual processing units, processing units of separate computers, processing units of separate processors of a single computer or processing units separated in any other appropriate way. In some embodiments, the computation of FIG. 6B comprises a pipelined computation (e.g., processing unit 650 executes Step A 652 on data while processing unit 654 executes Step B 656 on data previously processed by Step A 652, while processing unit 658 executes Step C 660 on data previously processed by Step A 652 and Step B 656, etc.). In some embodiments, each computational step of the set of computational steps shown in FIG. 6B adheres to pipelining criteria. In various embodiments, the pipelining criteria comprises an input data constraint (e.g., data input to a computational step is expected to be in a predetermined input format), an output data constraint (e.g., data output by a computational step comprises data in a predetermined output data format), a parallelism constraint (e.g., the computational step requires a number of computing resources bounded by a constraint), a workload constraint (e.g., the computational step is expected to require a workload bounded by a constraint), or any other appropriate constraint.

In various embodiments, Step A 652, Step B 656, Step C 660, Step D 664, and Step E 668 can each represent one or more computation steps that are grouped together as a subset of steps that are to be performed using a processor (e.g., a tenant associated processor, a commingling associated processor, a processor of the tenant data storage unit, a processor of a commingling storage unit, a processor of a multi-tenant data storage system, etc.).

The one or more computation steps may include searching, filtering, grouping, sorting, and mapping, as well as other analytic processes. In some cases, a calculation needs to be broken down into a set of steps that may or may not need to occur in order, and may or may not be parallelizable. Subsets of steps may as a unit require a specific sequence and/or be parallelizable. Consider the example where a user wishes to know how many workers are in each sales organization. Two possible strategies for performing this computation are:

Strategy A:
1) Search for all organizations
2) Filter to only SALES organizations
3) Count workers in each SALES organization Strategy B:
1) Find all workers
2) Group and count by organization
3) Filter groups to SALES organizations For pipelining, in both execution strategies, each step is dependent upon the results of the previous. However, transitions are suitable for pipelining in the event that the subsequent steps require only the input from the prior steps and do not require any additional context information known in the prior steps (e.g., from step 1→2 and from step 2→3 of strategy A and strategy B). In the event that an incremental output of a step can be processed independently, the step can be parallelized (e.g., the output of step 2 in either strategy A or strategy B can be processed in parallel by step 3).

For preprocessing versus main processing, transmission and processing factors are used to determine which portions of the data processing are allocated to preprocessing and which to main processing (and in some cases which to postprocessing). For example, if data transmission and storage costs are of a concern, it is preferable to front-load the heavy calculations in the tenant associated processor, so that the volume of information required to be sent to a commingling associated processor is reduced. As another example, if there are other business use cases that could be served by the same data sets, deferring some operations to the main processing stage is preferable. For example, if a different business user would want to know "how many workers are in organizations grouped by the organization's COUNTRY of headquarter", it would be preferable to defer the 'filter' step in both strategies for the "SALES" query" to the main commingling processing in order to avoid needing to re-run the prior worker/organization tenant processing for the new "COUNTRY" query. Additionally, as different steps will have different volumes of input and output data, and different processors will have different performance characteristics, both the selection of where to run sets of steps, and which sets of steps (or execution strategy) to run can influence overall performance. By selecting 'faster' strategies and running heavier computations on 'faster' processors, the overall efficiency of an analytic process can be increased. The performance of each computation can be recorded and used to influence the selection of similar processes for future analytic calculations.

Figure 7:
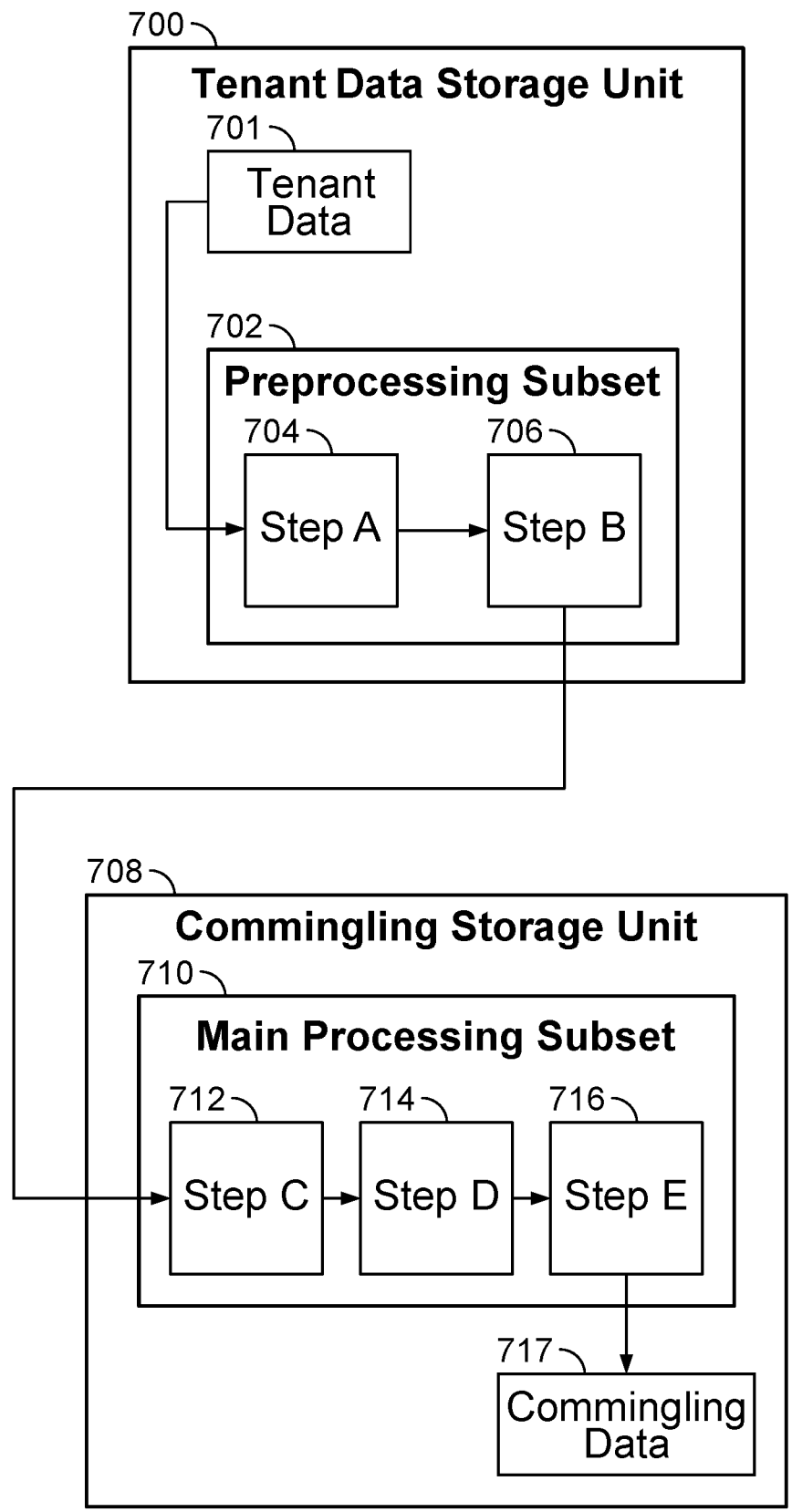
FIG. 7 is a block diagram illustrating an embodiment of a computation.

FIG. 7 is a block diagram illustrating an embodiment of a computation. In some embodiments, the computation of FIG. 7 comprises the computation of FIG. 6A. In the example shown, the computation of FIG. 7 is executed by executing Step A 704, followed by Step B 706, followed by Step C 712, followed by Step D 714, followed by Step E 716. Step A 704 receives input data and Step E 716 produces output data that is stored in commingling data 717. Step A 704, Step B 706, Step C 712, Step D 714, and Step E 716 together comprise a set of computational steps for executing the computation. Step A 704 and Step B 706 comprise preprocessing subset 702 executed by a processor associated with tenant data storage unit 700. Step C 712, Step D 714, and Step E 716 comprise main processing subset 710 executed by a processor associated with commingling storage unit 708. Data produced by Step B 706 is transferred from tenant data storage unit 700 to commingling storage unit 708 and used as input to Step C 712.

Tenant data 701 is input data to Step A 704 and comprises tenant data stored by tenant data storage unit 700. Preprocessing subset 702 comprises a subset of processing steps utilizing tenant data before it is commingled (e.g., using only tenant data from a single tenant data storage unit). In some embodiments, data from a plurality of preprocessing subsets on a plurality of tenant data storage units is provided as input to Step C 712. In some embodiments, preprocessing subset 702 and/or main processing subset 710 are implemented as a pipelined computation (e.g., Step A 704 and Step B 706 are executed simultaneously on sequential data sets by distinct processing units; Step C 712, Step D 714, and Step E 716 are executed simultaneously on sequential data sets by distinct processing units).

In cases where individual tenants describe their own tenanted data in a tenant-specific standard, calculations will need to be normalized to a common schema in order to be stored in the commingled storage (pre-process). Additionally, when reporting on commingled data the response information may or may not need to be de-normalized from the common schema back to the tenant-specific standard prior to reporting to an end-user (post process). These transformation operations will usually occur in pre and/or post processing steps, though in some cases could be applied in main processing if the commingling processor is aware of the transformation operations that need to occur.

In the case where a reporting query is issued and where the system does not have prior knowledge of the operation that the end-user will request, a tenant-side post process will need to occur to de-normalize the results, where each step in the de-normalization_process is dependent upon the results of the previous step. For example, the user queries to find the average dollars spent on team outings in 2016 by managers who have two or more direct reports that have less than one year of tenure as of an event date. One solution calculation includes determining the spend for all managers in 2016, and then once the aggregate data is returned for a tenant, the tenure filter is applied in a tenant post-processing step.

Figure 8:
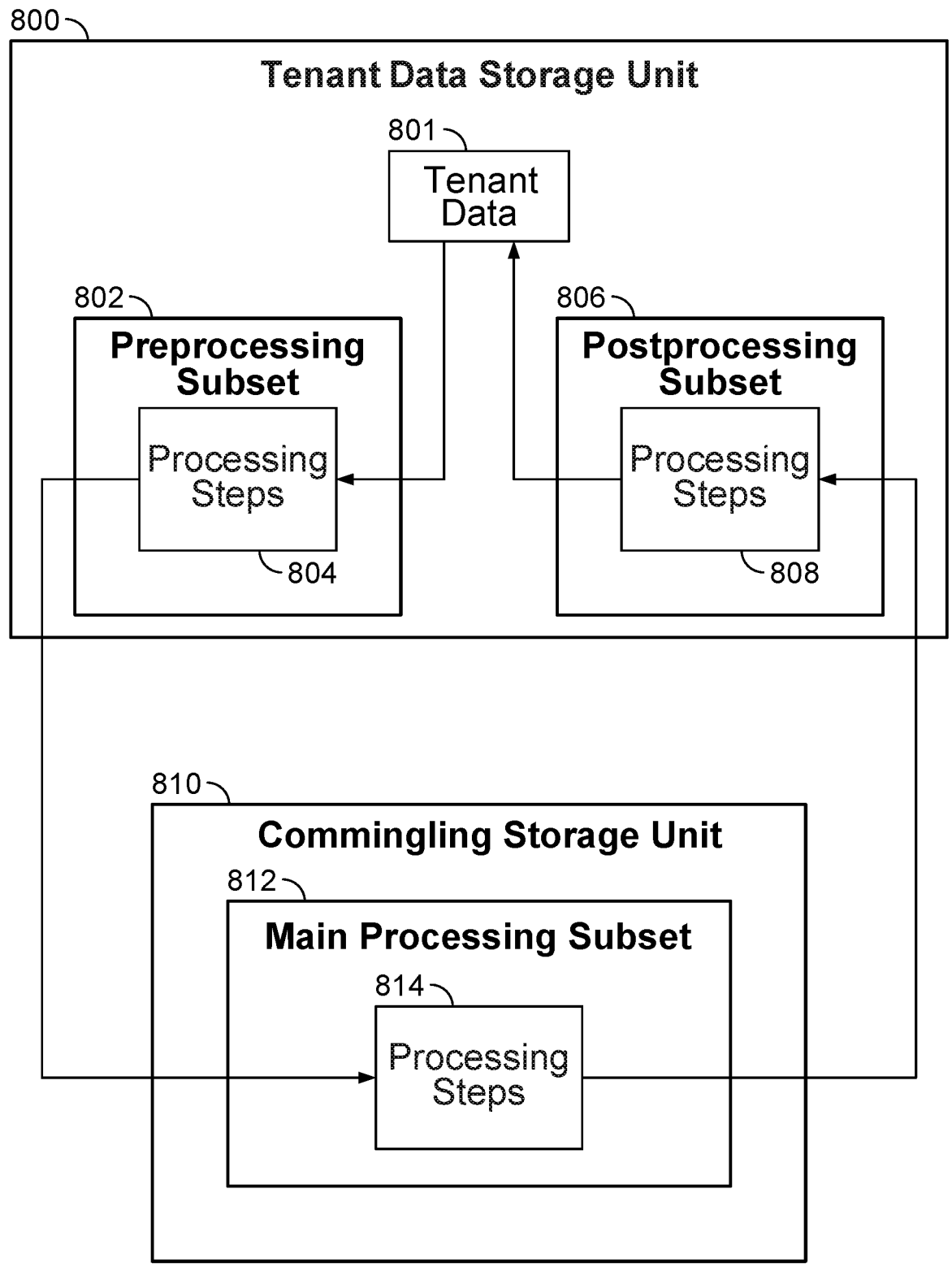
FIG. 8 is a block diagram illustrating an embodiment of a computation.

FIG. 8 is a block diagram illustrating an embodiment of a computation. In some embodiments, the computation of FIG. 8 comprises the computation of FIG. 6A. In the example shown, the computation of FIG. 8 is executed by executing processing steps 804 comprising preprocessing subset 802, followed by processing steps 814 comprising main processing subset 812, followed by processing steps 808 comprising postprocessing subset 806. Output data from processing steps 808 is placed back in tenant data 801 stored in tenant data storage unit 800. Preprocessing subset 802 and postprocessing subset 806 are executed by a processor associated with tenant data storage unit 800. Main processing subset 812 is executed by a processor associated with commingling storage unit 810. Input data to processing steps 804 comprises tenant data 801 stored by tenant data storage unit 800.

In some embodiments, the computation of FIG. 8 comprises a pipelined computation (e.g., preprocessing subset 802, main processing subset 812, and postprocessing subset 806 are executed simultaneously on sequential data sets). In some embodiments, each processing subset comprises a pipelined computation (e.g., the computational steps of processing steps 804 are executed simultaneously on sequential data sets, the computational steps of processing steps 814 are executed simultaneously on sequential data sets, the computational steps of processing steps 808 are executed simultaneously on sequential data sets).

Figure 9:
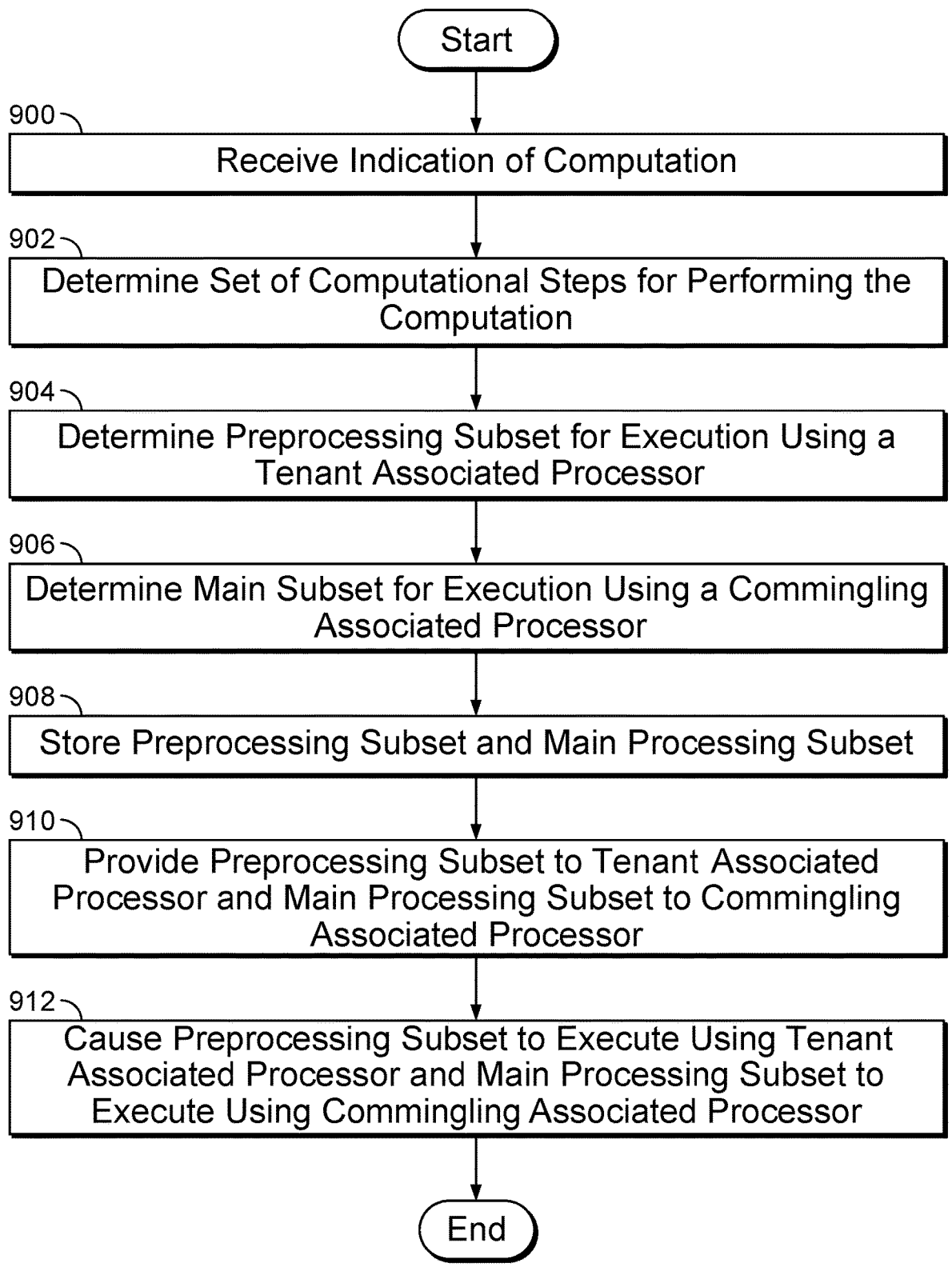
FIG. 9 is a flow diagram illustrating an embodiment of a process for performing a computation.

FIG. 9 is a flow diagram illustrating an embodiment of a process for performing a computation. In some embodiments, the process of FIG. 9 is executed by a multitenant database system (e.g., multitenant database system 106 of FIG. 1) or by commingling associated processor of tenant data storage system (e.g., tenant data storage system 104 of FIG. 1). In the example shown, in 900, an indication of a computation is received. In 902, a set of computational steps for performing the computation is determined. The set of computational steps comprises an ordered set of computational steps for performing the computation. In 904, a preprocessing subset for execution using a tenant associated processor. In 906, a main processing subset for execution using a commingling associated processor is determined. In 908, the preprocessing subset and the main processing subset are stored. In 910, the preprocessing subset is provided to tenant associated processor and the main processing subset is provided to commingling associated processor. In 912, the preprocessing subset is caused to be executed using a tenant associated processor and the main processing subset is caused to be executed using a commingling associated processor.

In some embodiments, each computational step of the set of computational steps determined in 902 adheres to pipelining criteria. In various embodiments, the pipelining criteria comprises an input data constraint (e.g., data input to a computational step is expected to be in a predetermined input format), an output data constraint (e.g., data output by a computational step comprises data in a predetermined output data format), a parallelism constraint (e.g., the computational step requires a number of computing resources bounded by a constraint), a workload constraint (e.g., the computational step is expected to require a workload bounded by a constraint), or any other appropriate constraint. Pipelining criteria comprise criteria for allowing the computational steps to be performed utilizing pipelined execution. In some embodiments, the preprocessing subset comprises an initial subset of the set of computational steps (e.g., the set of the first N steps of the set of computational steps). In some embodiments, the preprocessing subset comprises steps of the set of computational steps prior to a data commingling step (e.g., a step wherein data from different tenants is commingled). In some embodiments, a plurality of preprocessing subsets is determined (e.g., a preprocessing subset corresponding to each tenant data storage unit of a set of tenant data storage units). In some embodiments, the main processing subset comprises steps of the set of computational steps including and after a data commingling step. In some embodiments, the preprocessing subset and the main processing subset are stored on a commingling storage unit. In some embodiments, the preprocessing subset is provided to a tenant data storage unit for execution. In some embodiments, preprocessing subsets are provided to a plurality of tenant data storage units for execution. In some embodiments, the main processing subset is provided to a commingling storage unit for execution. In some embodiments, a plurality of preprocessing subsets (e.g., on a plurality of tenant data storage units) is caused to be executed.

In various embodiments, the preprocessing subset comprises one or more normalization computational steps (e.g., steps for normalizing tenant data), one or more single tenant calculation computational steps (e.g., performing a calculation on single tenant data), one or more single tenant aggregation computational steps (e.g., aggregation computational steps comprising aggregating data object instances of a sub-category), computing a sum, a product, a mean, a median, a mode, or an instance count, building a complex data structure (e.g., a list, an array, a data distribution, a data cube, etc.), one or more steps for determining derived data from a data object instance (e.g., performing a computation on data object instance values to determine data values, for example, determining a number of years at an organization, a number of employees, a compensation metric, a number of times changed job title, etc.), or any other appropriate computational steps. In some embodiments, the main processing subset comprises one or more multitenant calculation computational steps (e.g., performing a calculation on multiple tenant data). In some embodiments, the preprocessing subset comprises one or more multitenant aggregation computational steps (e.g., performing an aggregation on multiple tenant data).

Figure 10:
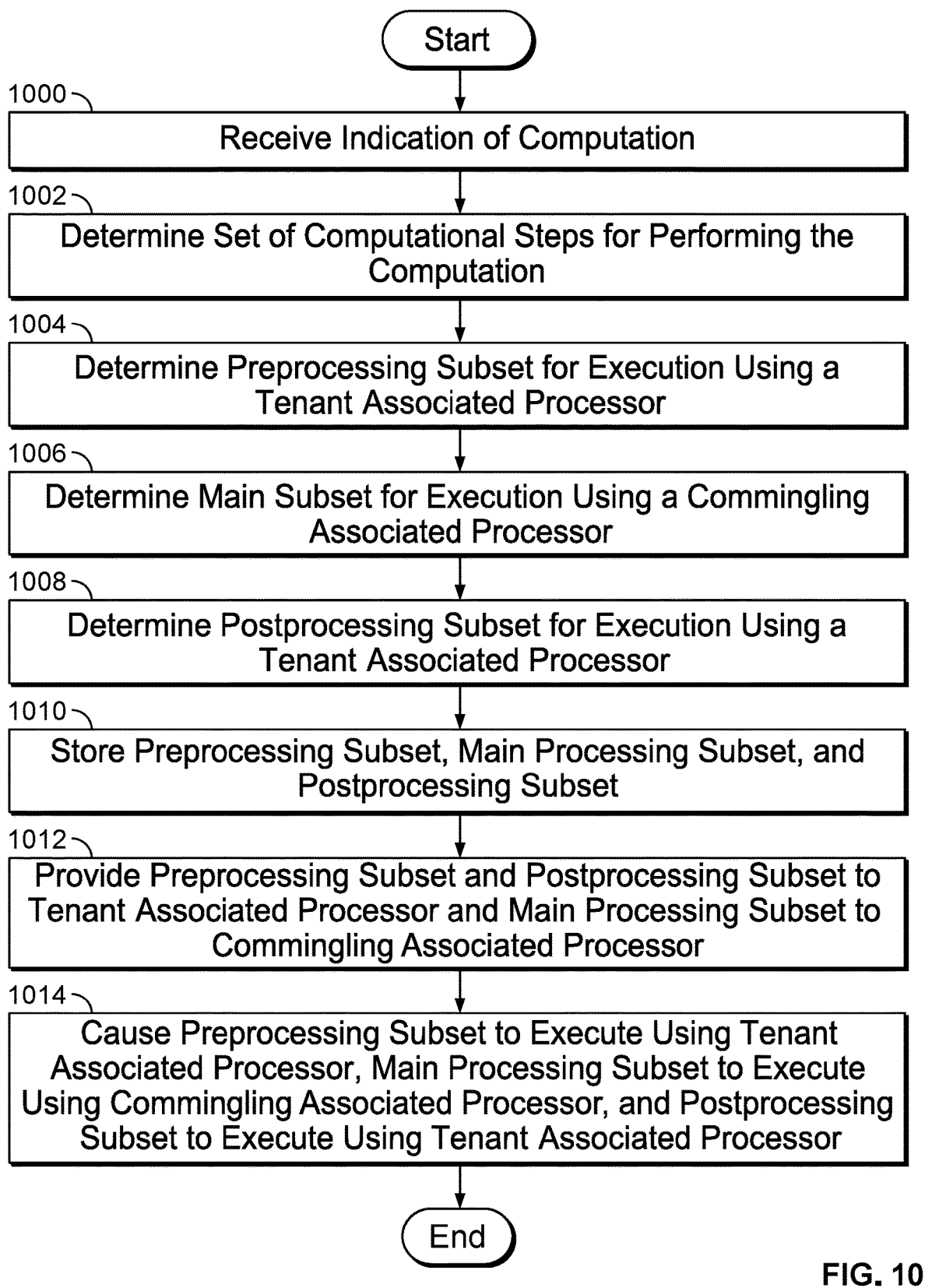
FIG. 10 is a flow diagram illustrating an embodiment of a process for performing a computation.

FIG. 10 is a flow diagram illustrating an embodiment of a process for performing a computation. In some embodiments, the process of FIG. 10 is executed by a multitenant database system (e.g., multitenant database system 106 of FIG. 1) or by commingling associated processor of tenant data storage system (e.g., tenant data storage system 104 of FIG. 1). In the example shown, in 1000, an indication of a computation is received. In 1002, a set of computational steps for performing the computation is determined. The set of computational steps comprises an ordered set of computational steps for performing the computation. In 1004, a preprocessing subset for execution using a tenant associated processor is determined. In 1006, a main processing subset for execution using a commingling associated processor is determined. In 1008, a postprocessing subset for execution using a tenant associated processor is determined.

In 1010, the preprocessing subset, the main processing subset, and the postprocessing subset are stored. In 1012, the preprocessing subset and postprocessing subset are provided to a tenant associated processor, and the main processing subset is provided to a commingling associated processor. In 1014, the preprocessing subset is caused to be executed using a tenant associated processor, the main processing subset is caused to be executed using a commingling associated processor, and the postprocessing subset is caused to be executed using a tenant associated processor. In various embodiments, the postprocessing subset comprises one or more post aggregation calculation steps (e.g., performing a calculation on aggregated tenant data), one or more post aggregation filtering steps (e.g., performing a filtering step on aggregated tenant data), one or more post aggregation security access steps (e.g., performing security authentication on aggregated tenant data), or any other appropriate computation steps.

Figure 11:
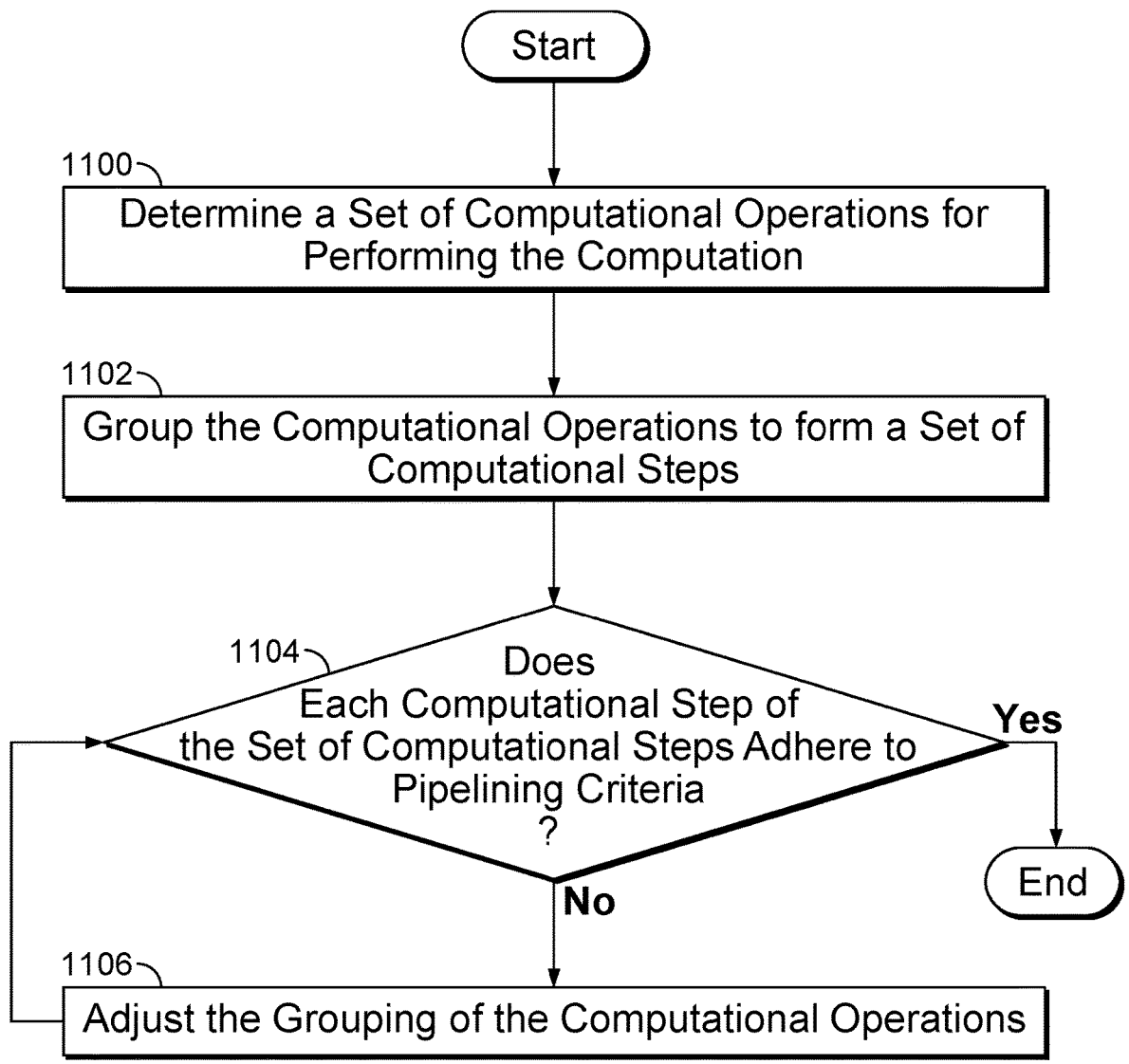
FIG. 11 is a flow diagram illustrating an embodiment of a process for determining a set of computational steps for performing the computation.

FIG. 11 is a flow diagram illustrating an embodiment of a process for determining a set of computational steps for performing the computation. In some embodiments, the process of FIG. 11 implements 902 of FIG. 9. In the example shown, in 1100, a set of computational operations for performing the computation is determined. In 1102, the computational operations are grouped to form a set of computational steps. In 1104, it is determined whether each computational step of the set of computational steps adheres to pipelining criteria. In the event it is determined that each computational step of the set of computational steps adheres to pipelining criteria, the process ends. In the event it is determined that each computational step of the set of computational steps does not adhere to pipelining criteria, control passes to 1106. In 1106, the grouping of computational operations is adjusted. Control then passes to 1104.

The system receives a request and determines a set of computation operations to answer the question. In some cases, the computation operations fit in more than one processing stage (e.g., preprocessing, main processing, or postprocessing). In some cases, a computation operation must occur in a specific stage. In some cases, the tenant has "known" information that is required for a filter operation on top of the data that only exists in the commingled data storage (e.g., the tenant knows a tenure length but team outing spend is commingled data), which forces the operation to be performed in a postprocessing stage (e.g., using a tenant associated processor). In other cases, the processing can be done in any stage and, in these cases, the stage decision is made dependent on one or more of the following constraints: data transfer limits, processor workload characteristics, or privacy associated with data, etc.

Figure 12:
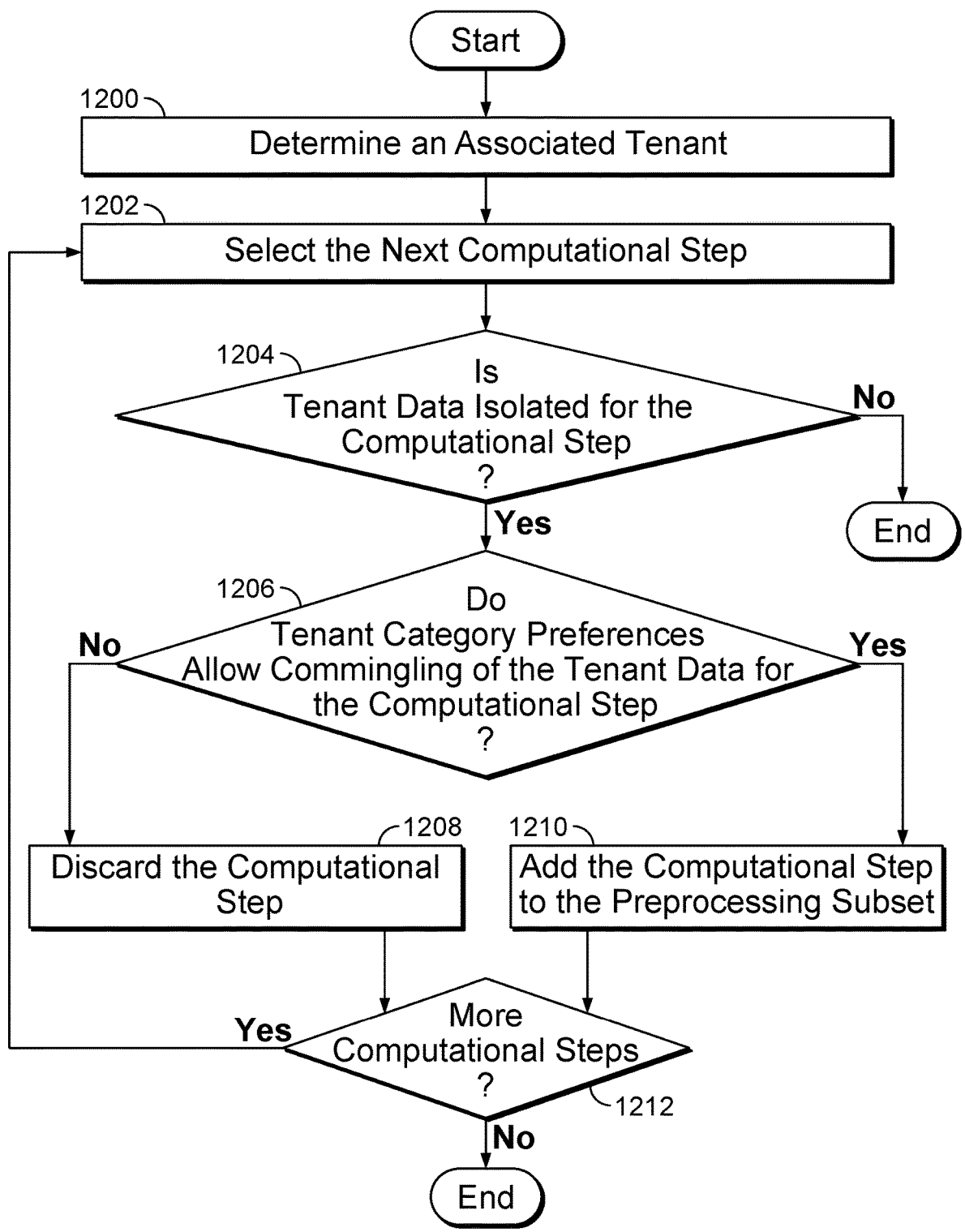
FIG. 12 is a flow diagram illustrating an embodiment of a process for determining a preprocessing subset that is to be provided to a tenant data storage unit.

FIG. 12 is a flow diagram illustrating an embodiment of a process for determining a preprocessing subset that is to be provided to a tenant data storage unit. In some embodiments, the process of FIG. 12 implements 904 of FIG. 9. In the example shown, in 1200, an associated tenant is determined (e.g., a tenant associated with the tenant data storage unit to which the preprocessing subset is to be provided). In some embodiments, the process of FIG. 12 is executed for each of a plurality of tenants. In 1202, the next computational step is selected. In some embodiments, the next computational step comprises the first computational step. In 1204, it is determined whether tenant data is isolated for the computational step (e.g., whether data associated with separate tenants is processed separately, or whether data associated with separate tenants is combined). In the event it is determined that tenant data is not isolated for the computational step, the process ends (e.g., the preprocessing subset comprises only the computational steps that have already been added to it and no more). In the event it is determined that tenant data is isolated for the computational step, control passes to 1206. In 1206, it is determined whether tenant category preferences allow commingling of the tenant data for the computational step (e.g., whether the tenant allows the tenant data used in the computational step to be combined with other tenant data). Tenant data can be combined in a later computational step of the set of computational steps, so data that is not allowed to be commingled should not be used. In the event it is determined that tenant category preferences do not allow commingling of the tenant data for the computational step, control passes to 1208. In 1208, the computational step is discarded. Control then passes to 1212. In the event it is determined in 1206 that the tenant category preferences allow commingling of the tenant data for the computational step, control passes to 1210. In 1210, the computational step is added to the preprocessing subset. In 1212, it is determined whether there are more computational steps. In the event it is determined that there are more computational steps, control passes to 1202. In the event it is determined that there are not more computational steps, the process ends.

In some embodiments, tenant category preferences comprise indications of data categories allowed by the tenant to be used in a commingled data process. In various embodiments, tenant category preferences comprise opt-in indications, indications associated categories, sub-categories, or metadata tags, or any other appropriate indications.

Figure 13:
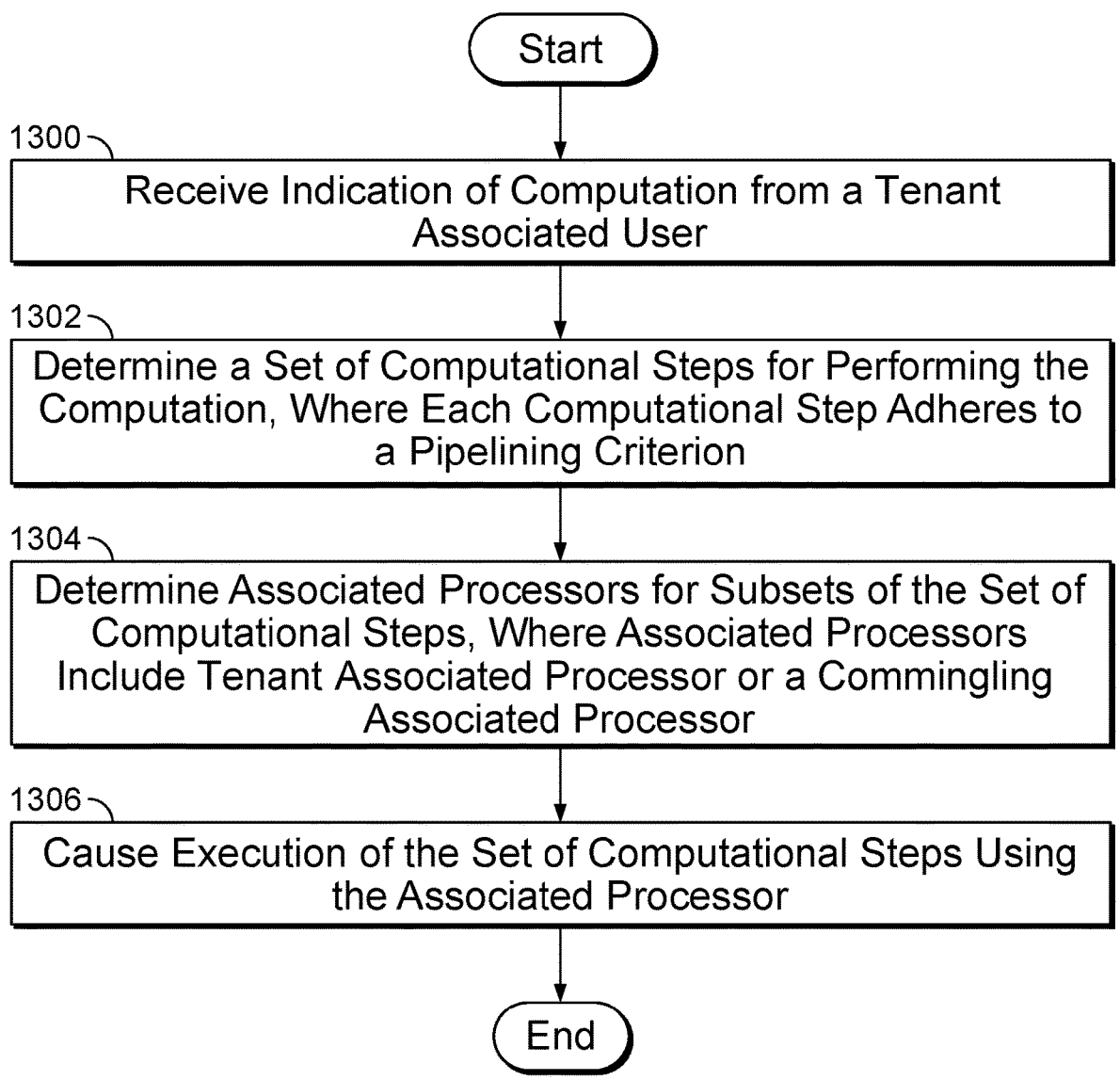
FIG. 13 is a flow diagram illustrating an embodiment of a process for performing a calculation.

FIG. 13 is a flow diagram illustrating an embodiment of a process for performing a calculation. In some embodiments, the process of FIG. 13 is executed by a multitenant database system (e.g., multitenant database system 106 of FIG. 1). In the example shown, in 1300 an indication is received of a computation from a tenant associated user. In 1302, a set of computational steps is determined for performing the computation, where each computational step adheres to a pipelining criterion. In 1304, associated processors are determined for subsets of the set of computational steps, where associated processors include tenant associated processor or a commingling associated processor. In 1306, execution is caused of the set of computational steps using the associated processor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing a computation, comprising:
a first tenant associated processor;
a second tenant associated processor;
a commingling associated processor;
an interface configured to:
  receive an indication of a computation; and
a processor configured to:
  determine a set of computational steps for performing the computation;
  determine a first preprocessing subset, wherein the first preprocessing subset comprises a first subset of the set of computational steps for execution by the first tenant associated processor, wherein the first preprocessing subset uses data associated with a first tenant;
  determine a second preprocessing subset, wherein the second preprocessing subset comprises a second subset of the set of computational steps for execution by the second tenant associated processor, wherein the second preprocessing subset uses data associated with a second tenant; and
  determine a main processing subset, wherein the main processing subset comprises a comingled subset of the set of computational steps for execution by the commingling associated processor wherein the computational steps included in the comingled subset are not included in the first subset or the second subset, wherein the main processing subset uses commingled data that at least includes data associated with the first tenant and the second tenant, wherein the commingled data includes an output of the first preprocessing subset and an output of the second preprocessing subset.

2. The system of claim 1, wherein the processor is further configured to cause storing the first preprocessing subset and the main processing subset in a commingling data storage.

3. The system of claim 1, wherein the processor is further configured to provide the first preprocessing subset to a tenant data storage unit for storage.

4. The system of claim 1, wherein the processor is further configured to provide corresponding preprocessing subsets to a plurality of tenant servers for execution.

5. The system of claim 1, wherein the processor is further configured to cause the first preprocessing subset to be executed by the first tenant associated processor.

6. The system of claim 1, wherein the processor is further configured to cause corresponding preprocessing subsets to be executed by a plurality of tenant servers.

7. The system of claim 1, wherein the processor is further configured to cause the main processing subset to be executed by commingling associated processor.

8. The system of claim 1, wherein the first preprocessing subset is based at least in part on tenant category preferences.

9. The system of claim 8, wherein the tenant category preferences comprise opt-in indications.

10. The system of claim 8, wherein the tenant category preferences are associated with categories.

11. The system of claim 8, wherein the tenant category preferences are associated with sub-categories.

12. The system of claim 8, wherein the tenant category preferences are associated with metadata tags.

13. The system of claim 1, wherein the first preprocessing subset comprises one or more aggregation computational steps.

14. The system of claim 13, wherein an aggregation computational step of the one or more aggregation computational steps comprises aggregating data object instances of a sub-category.

15. The system of claim 13, wherein an aggregation computational step of the one or more aggregation computational steps comprises computing one or more of the following: a sum, a product, a mean, a median, a mode, and an instance count.

16. The system of claim 13, wherein an aggregation computational step of the one or more aggregation computational steps includes building a complex data structure of one or more of the following: a list, an array, a data distribution, or a data cube.

17. The system of claim 1, wherein the first preprocessing subset comprises determining derived data from a data object instance of one or more of the following:
a number of years at an organization, a number of employees supervised, a compensation metric, or a number of times a job title has changed.

18. A method for performing a computation, comprising:
receiving an indication of a computation;
determining, using a processor, a set of computational steps for performing the computation;
determining a first preprocessing subset, wherein the first preprocessing subset comprises a first subset of the set of computational steps for execution by a first tenant associated processor, wherein the first preprocessing subset uses tenant data with a first tenant;
determining a second preprocessing subset, wherein the second preprocessing subset comprises a second subset of the set of computational steps for execution by a second tenant associated processor, wherein the second preprocessing subset uses data associated with a second tenant; and
determining a main processing subset, wherein the main processing subset comprises a comingled subset of the set of computational steps for execution by the commingling associated processor, wherein the computational steps included in the comingled subset are not included in the first subset or the second subset, wherein the main processing subset uses commingled data, wherein the commingled data that at least includes data associated with the first tenant and the second tenant, wherein the commingled data includes an output of the first preprocessing subset and an output of the second preprocessing subset.

19. A computer program product for performing a computation, the computer program product being embodied in a non-transitory computer readable storage medium and comprising computer instructions for:
receiving an indication of a computation;
determining, using a processor, a set of computational steps for performing the computation;
determining a first preprocessing subset, wherein the first preprocessing subset comprises a first subset of the set of computational steps for execution by a first tenant associated processor, wherein the first preprocessing subset uses tenant data with a first tenant;
determining a second preprocessing subset, wherein the second preprocessing subset comprises a second subset of the set of computational steps for execution by a second tenant associated processor, wherein the second preprocessing subset uses data associated with a second tenant; and
determining a main processing subset, wherein the main processing subset comprises a comingled subset of the set of computational steps for execution by the commingling associated processor wherein the computational steps included in the comingled subset are not included in the first subset or the second subset, wherein the main processing subset uses commingled data, wherein the commingled data that at least includes data associated with the first tenant and the second tenant, wherein the commingled data includes an output of the first preprocessing subset and an output of the second preprocessing subset.

* * * * *